United States Patent

[11] 3,622,785

| [72] | Inventors | James W. Irwin<br>Lake Oswego;<br>William L. Parker, Milwaukie; Bhim S. Savara, Portland, all of Oreg. |
|---|---|---|
| [21] | Appl. No. | 16,099 |
| [22] | Filed | Mar. 3, 1970 |
| [45] | Patented | Nov. 23, 1971 |
| [73] | Assignee | The United States of America as represented by the Secretary of the Army |

[54] INTRAORAL MINIMAL RADIATION FLUOROSCOPE
4 Claims, 1 Drawing Fig.

[52] U.S. Cl. .................................................. 250/77, 250/71.5 R, 250/213 VT
[51] Int. Cl. ............................................... H01j 31/50
[50] Field of Search ........................................ 250/71.5, 77, 213 VT; 350/96 B

[56] References Cited
UNITED STATES PATENTS

| 2,140,269 | 12/1938 | Pelkus et al. | 250/77 |
| 3,021,834 | 2/1962 | Sheldon | 250/213 VT X |
| 3,086,123 | 4/1963 | Marchal | 250/71.5 R X |
| 3,101,411 | 8/1963 | Richards | 250/77 X |
| 3,138,709 | 6/1964 | Cassen et al. | 250/71.5 R |

*Primary Examiner*—Archie R. Borchelt
*Attorneys*—Charles K. Wright, Jr., William G. Gapcynski and Lawrence A. Neureither ABSTRACT: A portable fluoroscopic unit which can be used intraorally or outside the body. The device comprises an X-ray source which generates a small number of short X-ray pulses, a curved fiber optic bundle with a phosphor deposited on the end intended for use within the oral cavity, an image intensifier, a television camera system, a video disc recorder, a television monitor, and synchronization means. An image is formed inside the mouth on the phosphor layer, this low-level image is then transmitted through the fiber optic bundle to an image intensifier. The amplified image is further amplified by the television camera system and is displayed on a monitor. A video recorder is used to freeze the image and retain a sufficient time for analysis without further X-ray exposure.

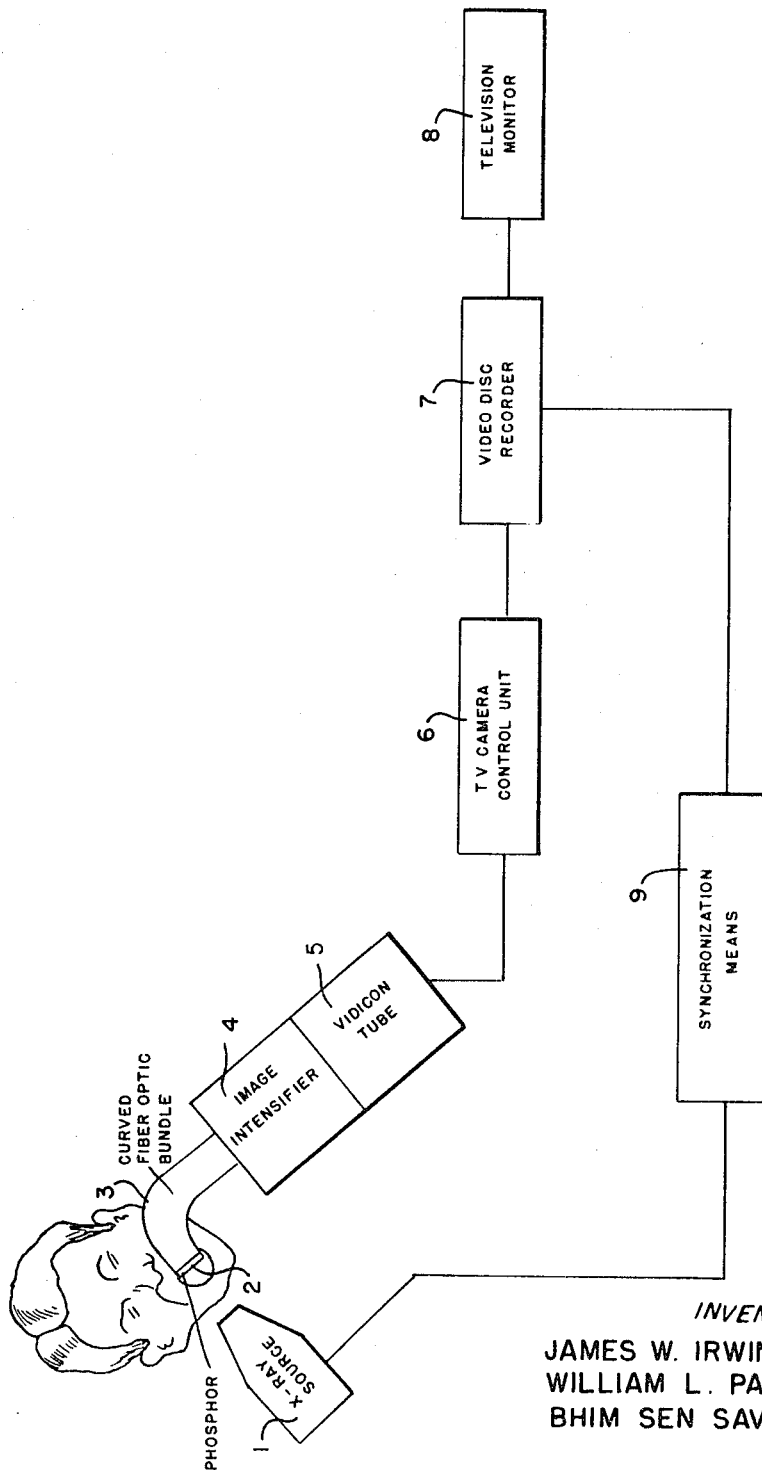
INVENTORS
JAMES W. IRWIN
WILLIAM L. PARKER
BHIM SEN SAVARA

INTRAORAL MINIMAL RADIATION FLUOROSCOPE

The invention herein described was made in the course of or under a contract or subcontract thereunder with the Department of the Army.

BACKGROUND OF THE INVENTION

1. Field of the Invention

This invention is an improved fluoroscopic unit intended for intraoral use, although it may also be used extraorally on other parts of the body.

2. Description of the Prior Art

Previous methods of obtaining X-ray images of the oral cavity have entailed the use of film plates positioned inside the mouth. It was not possible with these methods to view a "real time" image. Prior methods also required the use of radiation of higher intensity than desirable for prolonged exposure.

SUMMARY OF THE INVENTION

This invention is a fluoroscopic unit suitable for intraoral use as well as use over other parts of the body. It is portable and provides a clinically usable image with a fraction of the X-ray intensity formerly used. An X-ray source capable of providing very short X-ray pulses is used as the radiation source. A phosphor coating deposited on the face of a curved fiber optic bundle adapted for placement within the mouth forms a low-level image in response to the X-radiation. The low-level image is transmitted through the fiber optic bundle to an image intensifier which amplifies the image to above the visual threshold. The output from the image intensifier forms the input to a closed circuit television system which displays the image on a monitor. Since the image is of very short duration, a video disc recorder is included within the system to record the image and to replay it through a closed loop so that the image may be viewed for any desired length of time without further radiation exposure. Thus, with this system images can be obtained with radiation levels much less than those available with prior art systems, and use of the system in surgery to allow the surgeon to observe the location of foreign objects and his own instruments is possible with a minimum of X-ray exposure.

Accordingly, it is an object of this invention to provide a fluoroscope suitable for intraoral observations.

It is a further object of this invention to provide an intraoral fluoroscope which presents an X-ray image with greatly reduced radiation levels.

It is a further object of this invention to provide an intraoral fluoroscope capable of portable operation.

BRIEF DESCRIPTION OF THE DRAWING

The FIGURE is a function block diagram of the invention.

DESCRIPTION OF THE PREFERRED EMBODIMENT

Referring to the FIGURE the invention comprises an X-ray source 1, a phosphor layer 2 deposited on the face of the curved fiber optic bundle 3, an image intensifier 4 physically mounted upon and in optical communication with the curved fiber optic bundle 3, a television camera vidicon tube 5 physically mounted upon and in optical communication with the output of the image intensifier 4, a television camera control unit 6, a video disc recorder 7, a television display monitor 8, and synchronization means 9 connected between the X-ray source 1 and the video disc recorder 7.

A low-level, subvisual image is formed on the phosphor 2 by the radiation from the X-ray source 1, and this low-level image is transmitted through the curved fiber optic bundle 3, which is rigid in this embodiment but could be flexible, to the image intensifier 4. The image from the phosphor 2 impinges upon the photo cathode of the image intensifier and the electrons emitted from the photo cathode are accelerated so that a relatively brighter image is produced on the output phosphor of the image intensifier. This output image, which has been amplified to above the visual threshold, is the input to a vidicon tube 5 which produces the input signal to the closed circuit television system. This input signal is then processed and amplified by the television camera control unit 6. The output television picture signal is recorded by video disc recorder 7 so that the image may be played back as often as desired for analytical viewing without requiring additional X-radiation exposure. The output from the disc recorder 7 is applied to television monitor 8 for viewing of the X-ray image. Synchronization means 9 are provided between the video recorder and the X-ray source to provide triggering for the recorder at the optimal time to record a single pulse or group of pulses.

In operation, the X-ray source 1 is positioned so that the desired area of the body will be irradiated. The phosphor-clad fiber optic bundle 3, the image intensifier 4, and the vidicon tube 5 have been integrated into one handpiece for ease of use, and the handpiece is then positioned so that the phosphor is in line with the X-ray source 1 and the area of the body to be studied. The X-ray source 1 is then triggered to generate the desired amount of X-radiation. If only a single image is desired then a small amount of radiation is used; however, if continuous view of the area is desired, for example, as in a surgical procedure, then a series of X-ray pulses would be generated and the resulting images would be presented in time on the monitor 8. The X-radiation impinges on the phosphor 2 and generates a low-level subvisual signal which is then transmitted through the fiber optic bundle 3 to the image intensifier 4. The low-level signal is amplified by the image intensifier 4, and the closed circuit television system pick up the signal and displays it on the monitor 8. The use of a multiloop video recorder permits the selection of the best frame from the television system, and this frame may be displayed for as long as desired for analytical viewing. If a continuous view of the area is desired, the recorder can be programmed to present a new view to the monitor after a desired time increment, thus providing a continually updated image. In this manner the system could be used in surgery to show the surgeon the location of foreign bodies and his own instruments.

Although use in the oral cavity is described, the system is usable over other portions of the body as well. The system can easily be constructed in portable form, and in that form it would be useful in military applications as well as in field clinical work.

An embodiment of the invention constructed in accordance with the principles disclosed herein utilized an X-ray source capable of providing from one to 99 pulses of 60 nanosecond duration at a rate of 20 pulses per second. The phosphor was a laminated P-7 phosphor with emission peaks at 5,600 Angstoms and 4,350 Angstroms and was deposited on the intraoral end of the fiber optic bundle by a settling technique. The curved fiber optic bundle was about 6 inches in length and a 90° bend was made about 1 inch from the phosphor-clad end. The image intensifier tube provided a luminance gain of 150 at 23° C. The television camera system was a 525 line system and operated at a rate of 30 frames per second.

We claim:

1. An intraoral fluoroscope comprising a source of X-radiation adapted to direct radiation upon a phosphor layer deposited upon a first end of a curved fiber optic bundle, an image intensifier tube optically communicating with the second end of said fiber optic bundle, television means for scanning the output of said image intensifier tube and transmitting video information therefrom, display means for displaying the video signal from said television means, and a video recorder means to record and selectively display said video information upon said display means.

2. The intraoral fluoroscope of claim 1 in which said curved fiber optic bundle, said image intensifier tube, and said television means are physically integrated into a handpiece.

3. The device of claim 1 in which said video recording means is a multiloop video disc recorder.

4. The device of claim 3 in which synchronization means are provided between said X-radiation source and said video recorder to provide for optimum image recording.

* * * * *